United States Patent [19]

Rufkahr

[11] 4,364,310

[45] Dec. 21, 1982

[54] MOBILE BARBECUE APPARATUS

[75] Inventor: Bernard O. Rufkahr, St. Charles, Mo.

[73] Assignee: Ben R. Rufkahr, St. Charles, Mo.

[21] Appl. No.: 211,192

[22] Filed: Nov. 28, 1980

[51] Int. Cl.³ ............................................. A47J 37/04
[52] U.S. Cl. ........................................ 99/357; 99/397;
99/402; 99/427; 99/448; 108/44; 108/129;
126/25 R; 126/276
[58] Field of Search ............... 99/402, 427, 448, 357,
99/397, 339; 126/25 R, 9 R, 276; 108/12, 18,
19, 44, 129, 131, 132

[56] References Cited

U.S. PATENT DOCUMENTS

| | | | |
|---|---|---|---|
| 1,906,865 | 5/1933 | Knox | 108/129 X |
| 2,681,001 | 6/1954 | Smith | 99/402 |
| 3,025,782 | 3/1962 | Stall | 126/25 R X |
| 3,045,582 | 7/1962 | Wells | 126/25 R |
| 3,696,803 | 10/1972 | Holloway | 126/276 |
| 3,861,288 | 1/1975 | Cluff | 99/357 |
| 4,086,849 | 5/1978 | Simmons | 99/339 |
| 4,108,055 | 8/1978 | Simmons | 99/357 X |

Primary Examiner—Billy J. Wilhite
Attorney, Agent, or Firm—Graveley, Lieder & Woodruff

[57] ABSTRACT

A mobile barbecue apparatus is disclosed which comprises a firebox having wheels thereon with turnable receptacles for holding items to be cooked mounted above the firebox. The food containing receptacles are adjustable in width to accommodate different sized items such as steaks, chickens, ribs, etc., which are to be cooked. Preferably the top of the apparatus comprises a removable table having legs positioned at the edges which can be rotated into storage position or into table defining position.

9 Claims, 8 Drawing Figures

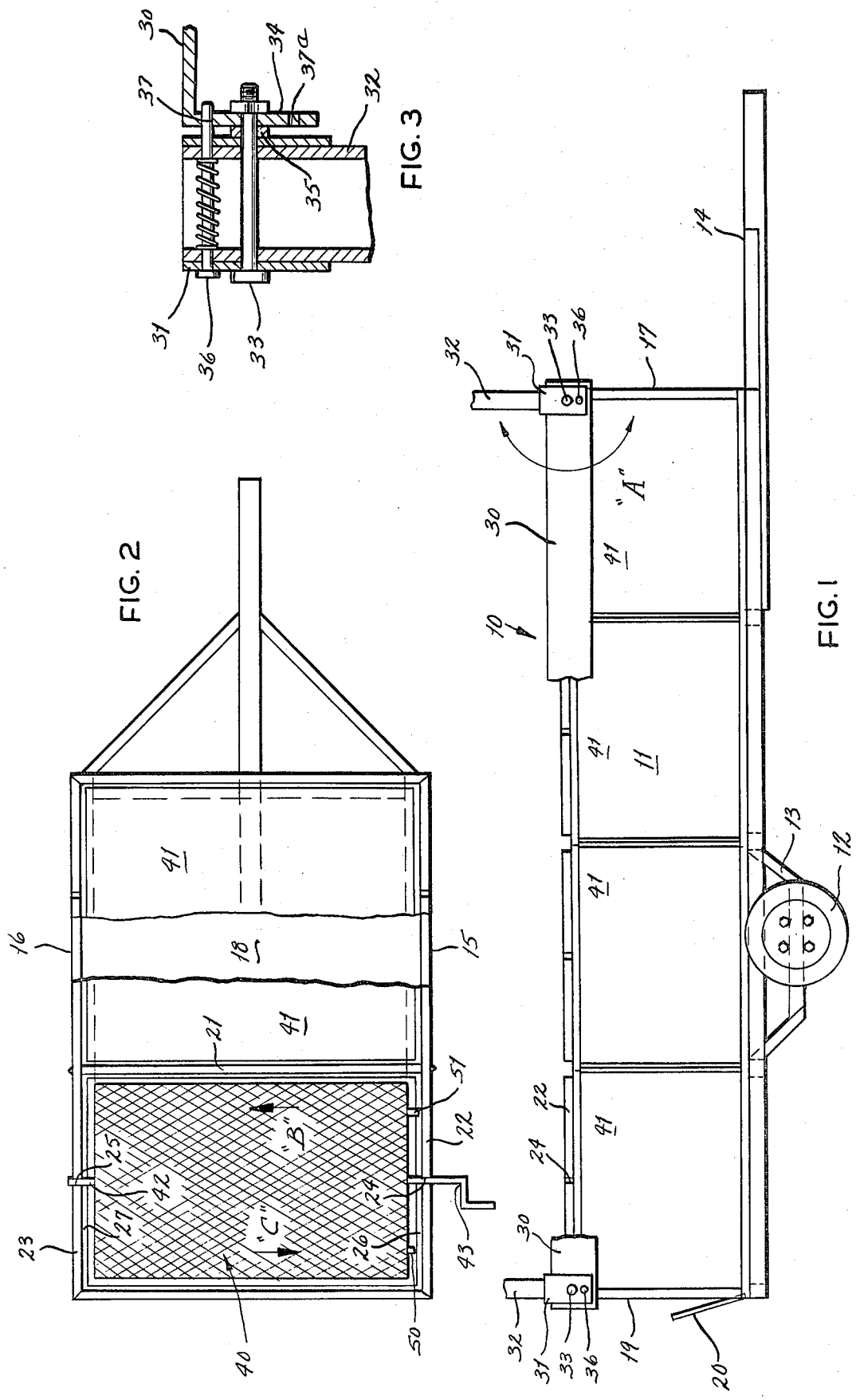

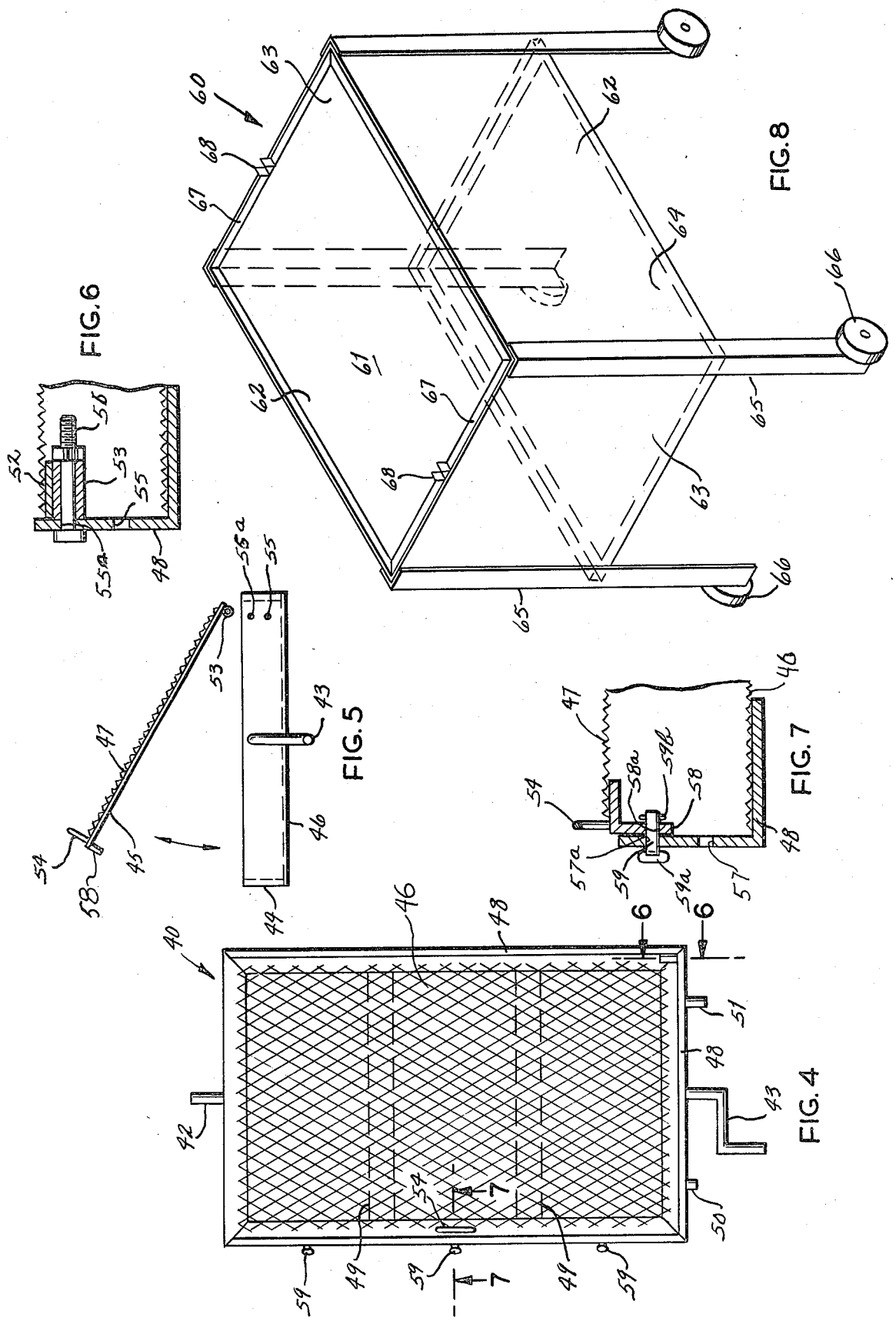

MOBILE BARBECUE APPARATUS

BACKGROUND OF THE INVENTION

Several prior U.S. Pat. Nos. disclose movable vehicles for cooking or barbecuing including Cluff 3,861,288, Holloway 3,696,803, Simmons 4,108,055, Simmons 4,086,849 and Stall 3,025,782. None of these are completely satisfactory and are complicated and expensive to build and do not provide a mechanism for turning the objects to be cooked without requiring the user to be extremely close to the fire, even to extending over the fire. Also, the conventional barbecue apparatus requires each item of food to be handled individually when the item is turned on the grill during cooking.

Accordingly, one of the principle objects of the present invention is to provide a mobile barbecue apparatus having means for positioning a large number of items to be cooked in a single receptacle and providing means for turning the receptacle so as to allow the food items to be cooked on both sides. It is another object of the invention to provide a mobile barbecue trailer in which one operator can cook a large number of food items by himself and thus result in considerable manpower savings in the cooking operation. This is important to charitable organizations which conduct a number of barbecues and have limited manpower available to operate the same.

It is still another object of the present invention to provide a mobile barbecue apparatus having a plurality of rotatable food containing members which are adjustable in width to accommodate different sized items to be cooked, such as thin steaks or chops, and thicker chicken parts, etc.

Still a further object of the present invention is to provide a mobile barbecue trailer in which the top member also functions as a table remote from the firebox when the barbecue device is being used. The combined table and firebox cover is provided with legs which can be locked into table defining position and into carrying or traveling position, when used as a cover for the barbecue device. The provision for the removable table allows the table to be positioned away from the firebox and set up to accommodate payment for the barbecue or for the taking of tickets or serving of condiments accompanying the barbecue, without being associated with the heat from the firebox.

These and other objects and advantages will become apparent in the following specification and claims.

SUMMARY OF THE INVENTION

The present invention comprises a mobile barbecue apparatus comprising a firebox mounted on wheels and provided with means for engaging a turnable cooking receptacle over the firebox, said receptacle being adjustable in width to accommodate food items of different widths therein.

DESCRIPTION OF THE DRAWINGS

In the drawings wherein like numbers refer to like objects wherever they occur:

FIG. 1 is a side elevational view of the barbecue apparatus of this invention with a portion of the top cover (table) broken away;

FIG. 2 is a foreshortened top plan view of the trailer with the top cover removed;

FIG. 3 is a fragmentary sectional view of the table leg and table top;

FIG. 4 is a plan view of a food holding receptacle removed from the barbecue trailer;

FIG. 5 is an exploded view of the receptacle of FIG. 4 in open position;

FIG. 6 is a fragmentary sectional view taken along line 6—6 of FIG. 4;

FIG. 7 is a fragmentary sectional view taken along line 7—7 of FIG. 4; and

FIG. 8 is a perspective view of a modification of this invention.

DETAILED DESCRIPTION

FIG. 1 shows the present invention embodied in a mobile barbecue apparatus 10 comprising a firebox 11 mounted on wheels 12 by means of conventional suspension system 13 and including a tongue 14 for connecting to a suitable truck or tractor (not shown). The firebox 11 is defined by opposed side walls 15 and 16, a front end wall 17, a bottom 18 and a rear wall 19. The rear wall 19 has a hinged door 20 provided with suitable latch means so that the door 20 can be opened for removal of ashes and the like.

The top of the firebox 11 is open except for cross braces 21. The top edges of the side walls 15 and 16 are defined by L-shaped brackets 22 and 23 which partly overlie the interior of the firebox 11 and which have spaced notches 24 and 25 cut at defined predetermined locations in the top edge thereof. The portions of the brackets 22 and 23 which overhang the interior of the firebox 11 are defined as flanges 26 and 27. The function of the flanges 26 and 27 and the notches 24 and 25 will be defined hereinafter.

In the preferred form of the barbecue apparatus 10 shown in FIGS. 1-7, a top cover 30 is provided for the firebox 11. The cover 30 also functions as a table in that leg supporting brackets 31 are positioned at the ends and at the center of the cover 30 and are rotatable between a carrying position (shown in FIG. 1) and a table supporting position (shown in FIG. 3). The leg supporting brackets 31 are hollow tubular members and carry legs 32 mounted therein. A center pivot pin 33 is positioned through each of the brackets 31, the legs 32 positioned in that bracket 31, and through a side wall 34 of the cover 30. A grommet 35, preferably of teflon or wear-resistant metal, is positioned between the cover side wall 34 and the bracket 31 to facilitate rotation of the bracket 31 without undue friction. A releasible spring loaded lock pin assembly 36 engages the cover side wall 34 and the bracket 31 to lock the bracket 31 and leg 32 in the alternative carrying and table supporting positions. The openings 37 and 37a in the cover side wall 34 are positioned at 180° to each other and the pin 36 is withdrawn from one of the openings 37, 37a to release the leg 32 and bracket 31 so they can be rotated to a second position where the pins 36 are inserted into a second of the openings 37, 37a to lock the leg 32 and bracket 31 in the desired position. The carrying position is shown in FIG. 1 and the table supporting position is shown in FIG. 3.

In the carrying position of FIG. 1, the legs 32 are directed away from the trailer firebox 11 and in this position, the legs 32 act as stakes so that folding leg tables, etc., can be carried on top of the cover 30. Because the firebox 11 is so low, the upright legs 32 act as sight posts for the driver of the vehicle pulling the apparatus 10, so he can locate the barbecue apparatus 10 when backing, etc.

When the cover 30 is removed from the trailer 10, the pins 36 are withdrawn from the openings 37a and (in the direction of the arrow "A" of FIG. 1) into a table defining position and are locked into place by reinserting the pins 36 in the openings 37 in the cover flange 34 (FIG. 3).

Again in the preferred embodiment as shown in FIGS. 1-7, a plurality of food holding baskets or receptacles 40 are provided in bays 41 defined by the firebox cross braces 21. Each of the receptacles 40 is provided with a support pin 42 and a crank 43 at opposite ends thereof with the pin 42 and crank 43 being positioned in the opposed notches 25 and 24 respectively in the L-shaped brackets 23 as hereinbefore described (FIG. 2).

Each of the receptacles 40 is defined by two members 44 and 45, the faces 46 and 47 of which are formed from expanded metal. The bottom member 44 of the receptacle 40 has an L-shaped frame 48 with intermediate cross pieces 49. The pin 42 and the crank 43 are welded to the frame 48 and, in addition adjacent to the crank 43 are two laterally positioned pins 50 and 51. The first pin 50 is shorter than the second pin 51 so that when the receptacle 40 is positioned in the firebox bay 41 it can be moved laterally. When the receptacle 40 is moved in the direction "B" of FIG. 2, the first pin 50 is free of engagement with the bracket flange 26, whereby the receptacle 40 can be rotated 180° until the second pin 51 engages the other side of the bracket flange 26. The receptacle 40 then can be moved toward the crank 43 (in the direction "C" of FIG. 2) so as to re-engage the first pin 50 with the flange 26 and secure the receptacle 40 in fixed position with respect to the firebox bay 41.

The receptacle top member 45 is defined by the expanded metal face 47 which is bounded by a frame 52. Two bushings 53 are mounted on the frame 52 adjacent to a first edge. A handle 54 is provided along the opposite frame edge.

In the bottom member frame 48 are spaced openings 55 and 55a (FIG. 6), so that fastening means 56 can be placed through one of the openings 55 or 55a and through the adjacent bushing 53 to define hinge means whereby the receptacle parts 44 and 45 can be opened and closed.

When the bushings 53 are aligned with the second opening 55a (as shown in FIG. 6), the width of the receptacle 40 is greater than when the bushings 53 are aligned with the first opening 55. Thus the space within the receptacle 40 can be varied to accommodate different food items of differing thickness.

Means are provided on the edges of the receptacle members 45 and 46 which are opposite to the hinged edges to lock the receptacle 40 in closed position. These locking means (FIG. 7) include a pair of spaced openings 57 and 57a in the bottom frame 48, and three depending lips 58 having openings 58a positioned on the top member 45. Three lock pins 59 are insertable through the openings 58a and one of the openings 57 or 57a to lock the receptacle 40 in closed position. Each of the lock pins 59 has a clasp ring 59a on one end and spring loaded ball bearings 59b on the other end. The rings 59 are snapped through the openings 57a and 58a to define the larger receptacle size and through the openings 57 and 58a to define the smaller receptacle size.

A modification of the present invention is shown in FIG. 8 and includes a portable barbecue apparatus 60 which accommodates only a single food receptacle. The receptacle is of a construction identical to that previously disclosed. The modified apparatus 60 includes a firebox 61 having side walls 62, end walls 63, a bottom 64 and upstanding side support members 65 which are provided with wheels 66 at their lower ends. The top edges 67 of the firebox ends 63 are provided with open ended brackets 68 which are designed to receive and accommodate the pin and crank of the receptacle as previously described.

The present invention is intended to cover all modifications and changes encompassed in the specification and drawings and is limited only by the claims which follow.

What is claimed is:

1. A portable barbecue apparatus comprising a firebox having a bottom and upstanding sides, wheels connected to said firebox for moving said barbecue apparatus, opposed bracket means on side top edges, a rotatable food holding receptacle having means for engaging said brackets, and means for releasibly positioning said receptacle means in cooking position over said firebox, said receptacle means being adjustable in width to accommodate items of different widths within said receptacle means, said receptacle comprising opposed walls having a plurality of openings therein, adjustable hinge means connecting the opposed walls adjacent to one common edge thereof, and adjustable lock means for locking together the side edges of the walls which are opposite of the hinged edges, the adjustable hinge means comprising bushings positioned on one wall and spaced openings in the side frame of a second wall and connecting means which when positioned through the bushings and one of the side frame openings defines a chamber between the two walls, and when positioned through the bushings and another of the side frame openings defines a chamber of different width between the two walls, and the lock means comprises spaced openings in a wall of one member alignable with an opening in a wall of the other member, and spring loaded lock means engagable with the said openings in each wall.

2. The barbecue apparatus of claim 1 including a removable cover for said firebox which is convertible into a table remote from said firebox, said cover comprising a top section surrounded by downturned side edges positioned around the sides of the firebox when in firebox cover configuration, and movable brackets positioned adjacent to the side edges of said cover, said brackets holding legs for supporting said cover when in its table configuration, pivot means holding the brackets to the cover, and lock means for securing the brackets and legs in a first table supporting position and also in a second cover position with the brackets and legs moved 180° from their table supporting position.

3. The apparatus of claim 2 wherein the lock means is a spring loaded pin positioned through the bracket and removably positioned in openings in the cover side edges, the said openings being on opposite sides of the pivot means.

4. A portable barbecue apparatus comprising a firebox having a bottom and upstanding sides, wheels connected to said firebox for moving said barbecue apparatus, opposed bracket means on opposed side top edges, a rotatable food holding receptacle including a crank fastened to the receptacle and positioned in one bracket and a stud positioned in the other bracket and fastened to the receptacle, the receptacle being laterally movable between the firebox sides, and means for releasibly positioning the receptacle over the firebox comprising studs of different lengths fixed to one side of the receptacle, the studs being sized such that when the receptacle is in a first position, both of the studs engage one of the firebox side walls and the receptacle is fixed in position and when the receptacle is moved away from the said firebox side only one stud engages said side whereby the receptacle is rotatable for 180°, and means for adjusting the size of said receptacle means to accommodate items of different widths within said receptacle means.

5. The barbecue apparatus of claim 4 wherein said receptacle comprises opposed walls having a plurality of openings therein, hinge means connecting the opposed walls adjacent to one common edge thereof, and lock means for locking together the side edges of the walls which are opposite of the hinged edges, the hinge means and the lock means both being adjustable to vary the distance between the opposed walls to accommodate items of different width and thickness therebetween, the adjustable hinge means comprising bushings positioned on one wall and spaced openings in the side frame of a second wall and connecting means which when positioned through the bushings and one of the side frame openings defines a chamber between the two walls, and when positioned through the bushings and another of the side frame openings defines a chamber of different width between the two walls, the lock means comprising spaced openings in a wall of one member alignable with an opening in a wall of the other member, and spring loaded lock means engagable with the said openings in each wall.

6. The barbecue apparatus of claim 5 including a removable cover for said firebox which is convertible into a table remote from said firebox, said cover comprising a top section surrounded by downturned side edges positioned around the sides of the firebox when in firebox cover configuration, and movable brackets positioned adjacent to the side edges of said cover, said brackets holding legs for supporting said cover when in its table configuration, pivot means holding the brackets to the cover, and lock means for securing the brackets and legs in a first table supporting position and also in a second cover position with the brackets and legs moved 180° from their table supporting position.

7. The apparatus of claim 6 wherein the lock means is a spring loaded pin positioned through the bracket and removably positioned in openings in the cover side edges, the said openings being on opposite sides of the pivot means.

8. The barbecue apparatus of claim 4 including a removable cover for said firebox which is convertible into a table remote from said firebox, said cover comprising a top section surrounded by downturned side edges positioned around the sides of the firebox when in firebox cover configuration, and movable brackets positioned adjacent to the side edges of said cover, said brackets holding legs for supporting said cover when in its table configuration, pivot means holding the brackets to the cover, and lock means for securing the brackets and legs in a first table supporting position and also in a second cover position with the brackets and legs moved 180° from their table supporting position.

9. The apparatus of claim 8 wherein the lock means is a spring loaded pin positioned through the bracket and removably positioned in openings in the cover side edges, the said openings being on opposite sides of the pivot means.

* * * * *